US00RE36669E

United States Patent [19]

Zilincar, III

[11] E Patent Number: Re. 36,669

[45] Reissued Date of Patent: Apr. 25, 2000

[54] DISPLAY POLE SUPPORT STRUCTURE

[75] Inventor: August J. Zilincar, III, Old Bridge, N.J.

[73] Assignee: Metaline Products Company Inc., South Amboy, N.J.

[21] Appl. No.: 09/136,812

[22] Filed: Sep. 25, 1998

Related U.S. Patent Documents

Reissue of:

[64] Patent No.: 5,657,884
Issued: Aug. 19, 1997
Appl. No.: 08/604,508
Filed: Feb. 21, 1996

[51] Int. Cl.[7] ..... A47F 5/00; A47F 10/02

[52] U.S. Cl. ..... 211/86.01; 211/57.1; 211/59.1; 211/103; 248/220.31; 248/220.41; 248/226.11; 248/227.2; 248/534

[58] Field of Search ..... 211/119.003, 57.1, 211/59.1, 103, 86.01, 113, 175, 118, 87.01; 248/218.4, 219.4, 245, 534, 220.31, 222.51, 220.43, 220.41, 226.11, 227.2, 227.3, 231.9, 304, 298.1

[56] References Cited

U.S. PATENT DOCUMENTS

| | | | |
|---|---|---|---|
| 1,307,069 | 6/1919 | Weismantel | 211/86.01 |
| 3,532,318 | 10/1970 | LLoyd | 248/220.41 X |
| 4,767,012 | 8/1988 | Simmons | 211/89.01 |
| 4,936,565 | 6/1990 | Fredrickson | 248/220.31 X |
| 5,346,166 | 9/1994 | Valiulis | 211/59.1 X |
| 5,443,167 | 8/1995 | Menaged et al. | 211/59.1 X |
| 5,477,971 | 12/1995 | Howard | 108/108 X |
| 5,505,319 | 4/1996 | Todd, Jr. | 211/163 X |
| 5,660,286 | 8/1997 | Shea | 211/87.01 |
| 5,678,702 | 10/1997 | Menaged et al. | 211/87.01 |
| 5,803,273 | 9/1998 | Menaged et al. | 211/87.01 |

OTHER PUBLICATIONS

SpaceXpander™ system illustration and assembly instructions—date unknown.

*Primary Examiner*—Robert W. Gibson, Jr.
*Attorney, Agent, or Firm*—David L. Davis

[57] ABSTRACT

Support structure for securing a display pole to a conventional supermarket shelving unit. The structure includes a bracket adapted to be mounted to the front of a pre-existing shelf by fingers which are inserted through apertures in the top surface of the shelf. The other end of the bracket includes a jacket member for holding the display pole. A pair of such brackets are utilized for holding the display pole, with the brackets in vertical alignment and each being mounted to a respective one of a pair of vertically spaced shelves.

16 Claims, 3 Drawing Sheets

DISPLAY POLE SUPPORT STRUCTURE

Matter enclosed in heavy brackets [ ] appears in the original patent but forms no part of this reissue specification; matter printed in italics indicates the additions made by reissue.

BACKGROUND OF THE INVENTION

This invention relates to display poles and, more particularly, to support structure for a display pole which is readily attachable to a pre-existing shelving unit and is adaptable for different size shelves.

In present day supermarkets, the proliferation of different products has resulted in a shortage of product display space. Thus, within an existing supermarket, the amount of shelving space is fixed and, as new products become available, there may not be shelving space which is able to accommodate such new products. Many products are packaged so that they are mounted on cards or the like (e.g., in blister packs) which are designed to be hung from a hanger which typically comprises a thin substantially horizontal rod mounted to an aperture in a fixed support. These packaged products do not require a shelf for their display and it is therefore desirable to not utilize any space that could be used for shelving to display such packaged products. It is therefore a primary object of the present invention to provide structure for displaying such packaged products which does not utilize any shelving space.

Since the shelves are already in existence, and are somewhat standardized, it is another object of the present invention to provide such structure which "piggybacks" onto pre-existing shelf space without interfering with products taking up the shelf space.

Although somewhat standardized, there are variations among shelving from different manufacturers. It is therefore a further object of the present invention to provide such structure which is adaptable to such varying shelving.

There presently exist display poles which are formed with a plurality of longitudinally spaced apertures adapted for supporting the aforementioned product hangers. An example of structure for holding such a display pole in front of a supermarket shelving unit is the SpaceXpander™ system sold by L & N Sales Co. of Huntingdon Valley, Pa. This structure includes a pair of extension rods which are secured at their rearward ends to pre-existing slots in one of the stanchions from which the shelves are hung, the stanchions being at the rear of the shelves. The display pole is then secured to the forward ends of the extension rods by means of machine screws. While somewhat effective, this structure is disadvantageous in that it is difficult to install, especially to pre-existing shelving which has product thereon. This structure is further disadvantageous because in order to adapt to different depth shelves, different length extension rods must be provided. It is therefore a more specific object of this invention to provide structure which supports a display pole, is easy to install, and which adapts to varying shelving without requiring the replacement of parts.

SUMMARY OF THE INVENTION

Conventional supermarket shelving includes a substantially horizontal shelf having a planar top surface terminating in a front edge. A plurality of apertures through the top surface of the shelf are typically arranged at spaced locations along a line parallel to the front edge of the shelf. The aforedescribed objects are attained in accordance with the principles of this invention by providing a bracket for supporting a display pole in a substantially vertical orientation, the bracket being adapted for mounting to such a shelf by means of the apertures. The bracket includes a substantially planar plate member having at least one finger extending from an edge of the plate member. The finger is sized to fit within a respective one of the shelf apertures and is displaced out of the plane of the plate member so that the plate member can rest on the planar top surface of the shelf with the finger extending through the respective aperture. The bracket also includes a jacket member adapted to at least partially surround the pole so as to substantially limit lateral movement of the pole with respect to the jacket member, and a coupler for coupling the jacket member to the plate member in such orientation that the pole is oriented substantially vertically when held by the jacket member when the plate member rests on the planar top surface of the shelf.

In accordance with an aspect of this invention, the finger is configured to extend away from and back towards the plane of the plate member as the finger is traversed from the plate member edge to the distal end of the finger.

A supermarket shelf usually includes a lip which extends concavely downwardly and forwardly from the shelf front edge to terminate in a lip edge parallel to the shelf front edge. This lip is typically used to hold a card with pricing information for products on the shelf. In accordance with another aspect of this invention, the bracket further includes a stabilizer plate adapted to engage the lip edge when the plate member rests on the planar top surface of the shelf with the finger extending through the respective shelf aperture.

In accordance with yet another aspect of this invention, the coupler includes an elongated bar member secured at a first end to the jacket member and at a second end to the stabilizer plate. An elongated coupling member is secured at a first end to the plate member opposite the finger and .extending away from the finger, the coupling member being adapted for longitudinal overlapping sliding engagement with the bar member. Adjustable securing means are provided for securing the coupling member to the bar member with a desired overlap therebetween so that the position of the stabilizer plate relative to the plate member is such to insure that the stabilizer plate engages the lip edge when the plate member rests on the planar top surface of the shelf with the finger extending through the respective aperture.

In accordance with a further aspect of this invention, there is provided a pole support system for use with a pair of vertically spaced substantially horizontal shelves and including a pair of the aforedescribed brackets, wherein a first of the brackets is secured to a first of the shelves and the second of the brackets is secured to the second of the shelves in vertical alignment with the first bracket.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
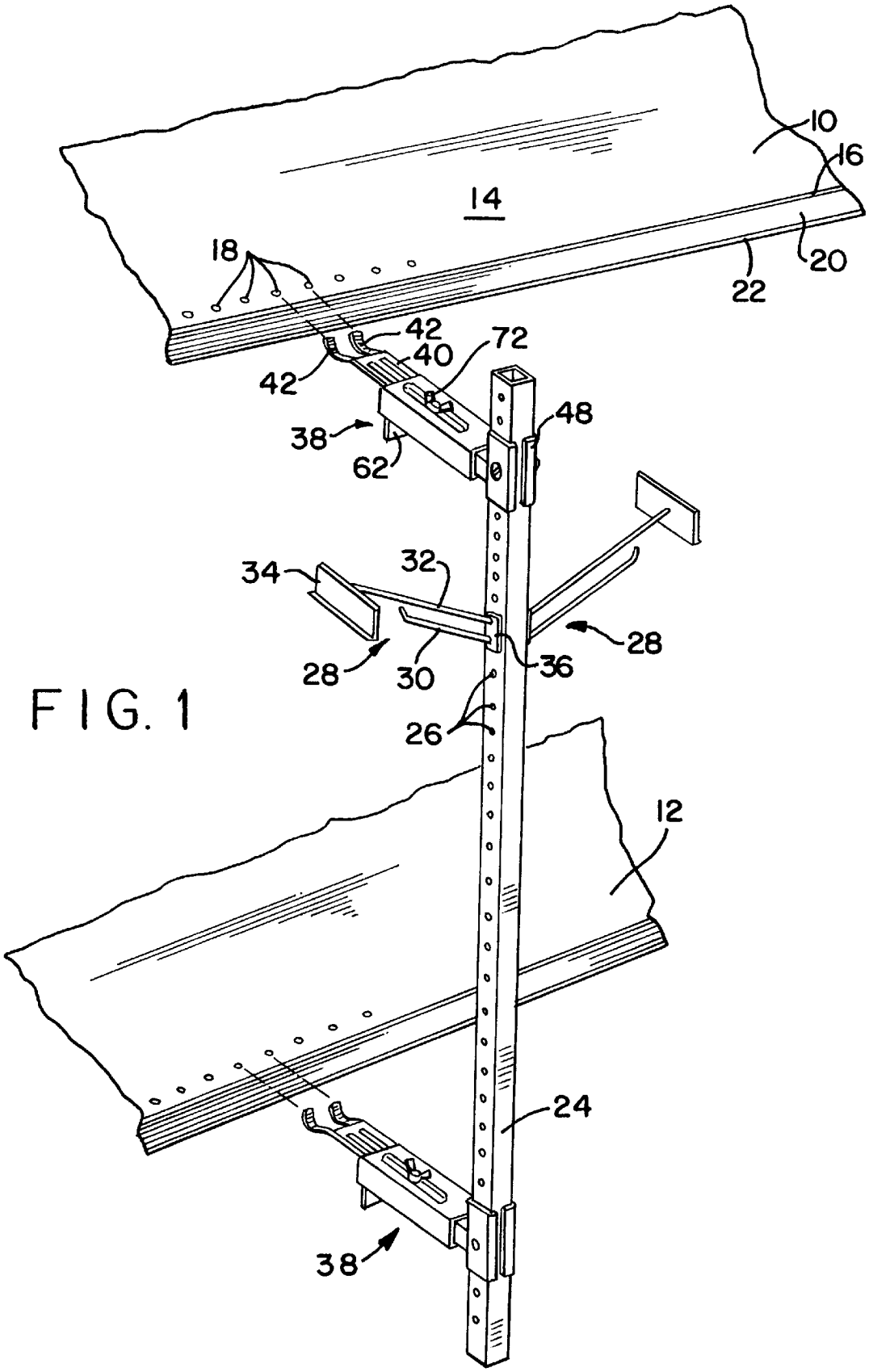
FIG. 1 is a partial perspective view of a shelving unit to which is mounted a display pole support system according to the present invention.

Referring now to the drawings, FIG. 1 shows a pair of vertically spaced substantially horizontal supermarket shelves 10, 12. As shown, the shelf 10 has a planar top surface 14 terminating in a front edge 16. A plurality of apertures 18 through the surface 14 are arranged at spaced locations along a line parallel to the front edge 16. The shelf 10 further includes a lip 20 which extends concavely downwardly and forwardly from the shelf front edge 16 to terminate in a lip edge 22 which is parallel to the shelf front edge 16. Such a lip 20 typically is used to hold a card with pricing information for products on the shelf 10. The shelf 12 typically is identical to the shelf 10 and both of the shelves 10, 12 have structure (not shown) at their rearward ends which engage slots in vertical stanchions to support the shelves thereon, as is conventional. While described in the environment of a supermarket such shelving is also utilized in other types of commercial retail establishments, and it is not intended that this invention be limited to use in supermarkets.

FIG. 1 also illustrates a display pole 24 of the type supported by the inventive structure. As shown, the display pole 24 is a long hollow tube, illustratively rectangular in cross section, with a plurality of longitudinally spaced apertures 26 on opposed sides. Although shown as being square, the display pole 24 can have any desired cross-sectional configuration. Thus, the display pole 24 can also be rectangular, round, triangular, or even be a U-channel. The display pole 24 is adapted to support a plurality of product hangers 28 along its length. An exemplary hanger is the Scan-Lok™ hanger manufactured by T-PlasTech Corp., of Englewood, Colo. The hangers 28 each includes a substantially horizontal rod 30 for supporting products mounted on cards or the like (e.g., in blister packs) and a rod 32 terminating in a holder 34 for product identification and price information. The rods 30, 32 extend from a plate 36 which has a pair of projections (not shown) extending from its other surface which are adapted to each pass through a respective one of the apertures 26 so as to mount the hanger 28 to the pole 24. Conventionally, the hanger 28 is a unitary structure molded from plastic.

Figures 2, 3:
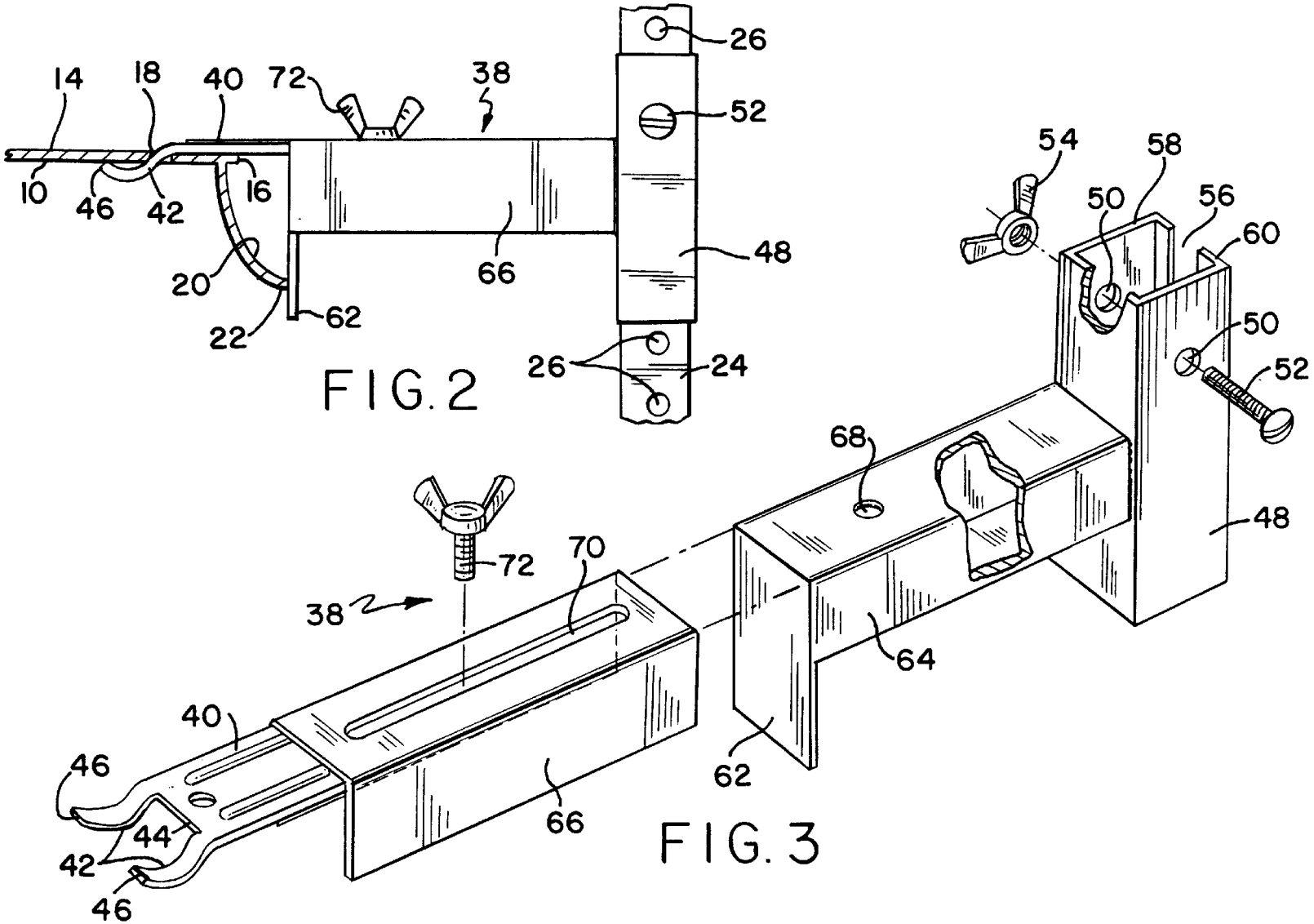
FIG. 2 is a side view showing a first embodiment of an inventive adjustable bracket mounted to a shelf and holding a display pole.
FIG. 3 is an exploded perspective view of the bracket of FIG. 2.

The inventive support structure comprises a bracket, designated generally by the reference numeral 38, and adapted to be used in pairs. The bracket 38 is preferably formed of metal, although it can also be molded from plastic, and is designed to engage a pair of the apertures 18 at a first end and hold the display pole 24 at a second end. Thus, the inventive bracket is suspended from the front of the shelf 10 so that, without replacement of any parts, the bracket 38 can be used with any depth shelf. As shown in FIGS. 1–3, the inventive bracket 38 includes a substantially planar plate member 40 having a pair of fingers 42 extending from an edge 44 of the plate member 40. The fingers 42 are sized to fit within the apertures 18 and are shaped to extend away from and back toward the plane of the plate member 40 as a finger 42 is traversed from the edge 44 to its distal end 46. Thus, as best shown in FIG. 2, the plate member 40 can overlie and rest on the planar top surface 14 of the shelf 10 with the fingers 42 extending through respective apertures 18. The shape of the fingers 42 is such that they are readily insertable through respective apertures 18 when the plate member 40 is held in a substantially vertical orientation but cannot be removed from the apertures 18 when the plate member 40 is rotated to a substantially horizontal position overlying the planar top surface 14.

The bracket 38 further includes a jacket member 48 for at least partially surrounding the display pole 24 so as to substantially limit lateral movement of the pole 24 with respect to the jacket member 48. Illustratively, the jacket member 48 is a hollow tube having the same cross sectional configuration as the pole 24 and with internal dimensions sized slightly larger than the external dimensions of the pole 24 so as to provide slight clearance for the pole 24 to be moved longitudinally within the jacket member 48 for adjustment purposes. The jacket member 48 is formed with a pair of opposed apertures 50 on two sides. A bolt 52 and wing nut 54 are preferably provided. The bolt 52 is adapted to extend through a first one of the apertures 50, through a pair of opposed apertures 26 of the pole 24, and through the other aperture 50 of the jacket member 48. The wing nut 54 is then secured to the bolt 52 to hold the pole 24 securely therein so as to prevent longitudinal movement of the pole 24. Preferably, the front end of the jacket member 48 is formed with a gap 56 so that the wing nut 54 can be tightened to bring the side walls 58, 60 of the jacket member 48 closer together to secure the pole 24 against lateral displacement.

The bracket 38 further includes a coupler for coupling the jacket member 48 to the plate member 40 in such orientation that the pole 24 is oriented substantially vertically when held by the jacket member 48 when the plate member 40 rests on the shelf top surface 14. In the embodiment shown in FIGS. 1–3, the coupler is adjustable, as will be described in full detail hereinafter. As previously described, the shelf 10 includes a lip 20. To provide stability to the bracket 38 when the fingers 42 extend through the apertures 18 of the shelf 10, the coupler includes a downwardly extending stabilizer plate 62 which is adapted to engage the lip edge 22 when the bracket 38 is mounted to the shelf 10, as best shown in FIG. 2. In the embodiment shown in FIGS. 1–3, the coupler is adjustable to accommodate varying shelf dimensions including the spacing of the apertures 18 from the front edge 16 and the horizontal displacement of the lip edge 22 from the front edge 16. Accordingly, the coupler includes an elongated bar member 64 having a first end welded to the jacket member 48 and a second end welded to the stabilizer plate 62. Illustratively, the bar member 64 is formed of hollow rectangular tubing.

The coupler also includes an elongated coupling member 66 secured, as by welding, to the plate member 40 at the end of the plate member 40 opposite the fingers 42, the coupling member 66 extending away from the fingers 42. As an alternative to the welding of the pieces 40, 66, the plate member 40 together with the coupling member 66 can be stamped and formed from a single piece of sheet metal. Preferably, the coupling member 66 is a three-sided and right angled body sized to overlap the bar member 64 with slight clearance to allow longitudinal sliding motion therebetween. To adjustably secure the coupling member 66 to the bar member 64, the bar member 64 is formed with a threaded aperture 68 in its top surface and the coupling member 66 is formed with an elongated slot 70 through its top surface. The positions of the aperture 68 and the slot 70 are such that when the coupling member 66 overlies the bar member 64, the aperture 68 is exposed through the slot 70. There is further provided a wing screw 72 which extends through the slot 70 into threaded engagement with the aperture 68. When the desired overlapping between the coupling member 66 and the bar member 64 is achieved so that the stabilizer plate 62 engages the lip edge 22, the wing screw 72 is tightened to securely clamp the coupling member 66 to the bar member 64.

In use, a pair of the brackets 38 support a pole 24. One of the brackets 38 is mounted to an upper one of the shelves in a shelving unit and the other bracket 38 is mounted to a lower one of the shelves in vertical alignment with the upper bracket. During mounting of the brackets, the overlap between the coupling member 66 and the bar member 64 of each bracket is adjusted and secured. The pole 24 is then inserted through the pair of vertically aligned jacket members 48 and adjusted to the desired height. The bolt 52 is then installed in the upper one of the brackets 38 to securely hold the display pole 24. The hangers 28 are then mounted to the pole 24 at desired locations along the length of the pole 24.

It is noted that although the upper and lower brackets are preferably identical, only one of the brackets needs to have the bolt 52 installed therein. It is further noted that the pole 24 can be suspended at any desired height and does not necessarily have to rest on the floor or the shelving unit base.

Figure 4:
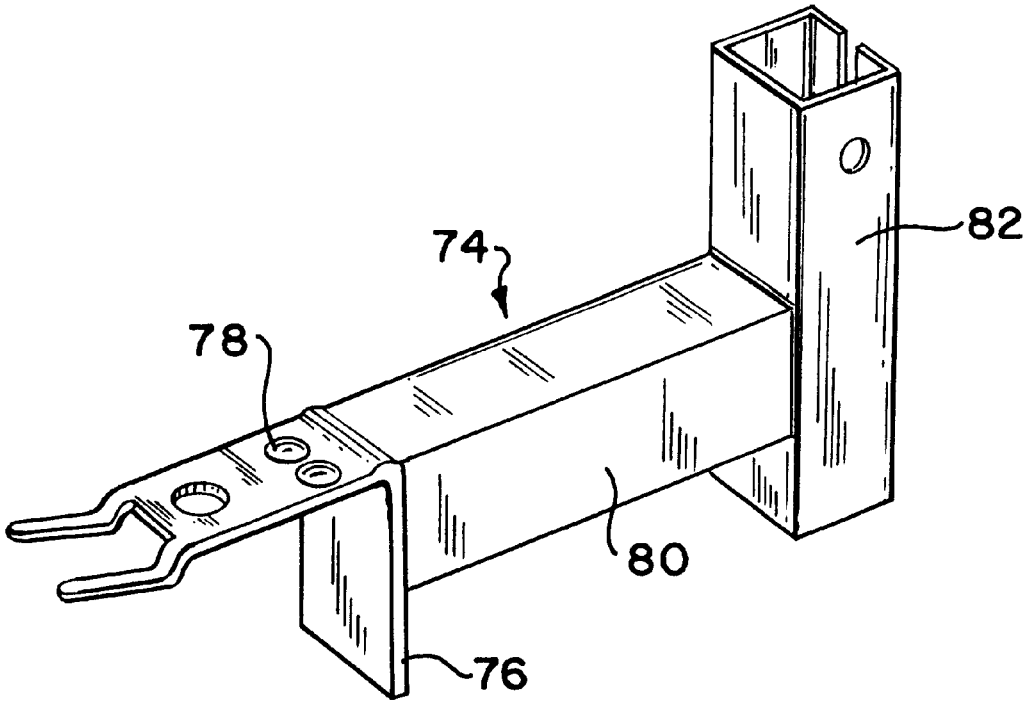
FIG. 4 is a perspective view showing an alternative embodiment of an inventive bracket where the position of the stabilizer plate is not adjustable.

There may be certain instances where adjustability of the coupler is not a requirement. FIG. 4 shows an embodiment of an inventive bracket 74 where there is no adjustability of the distance between the stabilizer plate 76 and the plate member 78. Thus, the stabilizer plate 76 and the plate member 78 may be formed from a single piece of sheet metal and the bar member 80 may be welded at one end to the stabilizer plate 76 and at the other end to the jacket member 82.

Figure 5:
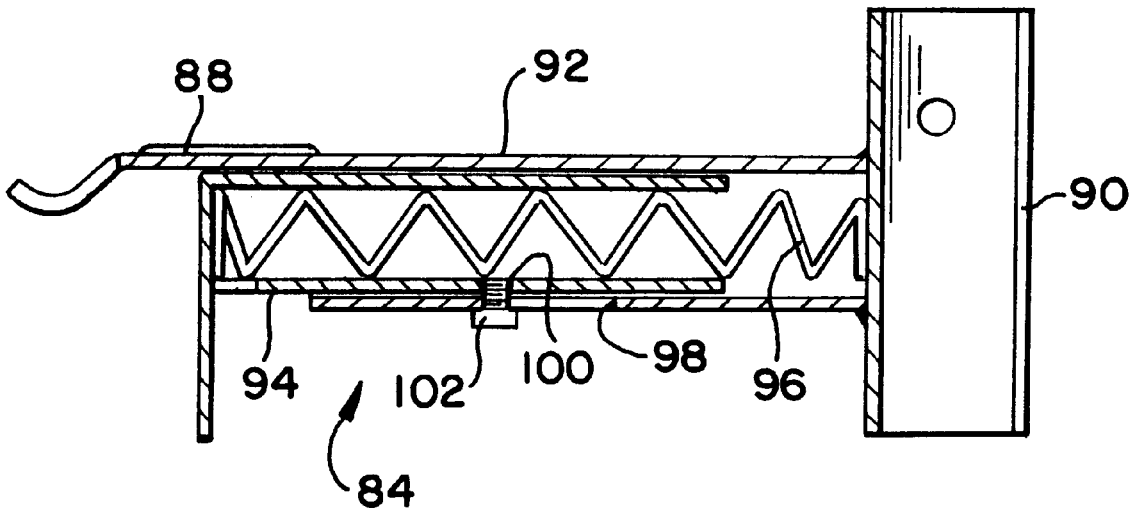
FIG. 5 is a longitudinal cross-sectional view of another alternative embodiment of an inventive bracket where the position of the stabilizer plate relative to the plate member is self-adjusting.

FIG. 5 illustrates an embodiment of an inventive bracket 84 wherein the position of the stabilizer plate 86 is self-adjustable relative to the plate member 88 so that the bracket 84 automatically adapts to any size shelf lip 20. As shown, the bracket 84 includes a jacket member 90 the same as the previously described jacket members. A first elongated hollow bar 92 is welded at a first end to a side of the jacket member 90 so that the jacket member 90 closes that end of the bar 92. The other end of the hollow bar 92 is open, and the plate member extends beyond that open end, preferably as a continuation of the top surface of the bar 92. The stabilizer plate 86 is welded to a second hollow bar 94 and closes a first end thereof. The other end of the hollow bar 94 is open. The hollow bar 94 is disposed within the hollow bar 92, with the stabilizer plate 86 extending out past the open end of the bar 92. The bar 94 is sized so that it is free to move longitudinally in the bar 92. A compression spring 96 is disposed within the bars 92 and 94, with a first end of the spring 96 bearing against the side of the jacket member 90 which closes off the end of the bar 92 and the second end of the spring 96 bearing against the stabilizer plate 86 which closes off the end of the bar 94. Accordingly, the stabilizer plate 86 is resiliently biased toward the left, as viewed in FIG. 5, so that when the bracket 84 is secured to a shelf, the stabilizer plate 86 bears against the lip edge 22. To limit movement of the bar 94 relative to the bar 92, the bar 92 is formed with an elongated longitudinal slot 98 and the bar 94 is formed with an opening 100 in registration with the slot 98. A pin is then provided which extends through the slot 98 and into the opening 100. Preferably, the opening 100 is internally threaded and the pin comprises a short threaded screw 102. To assemble the bracket 84, the spring 96 is placed within the bar 94 and then the spring 96 and the bar 94 are together inserted into the bar 92. The screw 102 is then inserted through the slot 98 and threaded into the opening 100. The screw 102 therefore functions to hold the bracket 84 together as well as to limit movement of the bar 94 by butting against the ends of the slot 98.

Accordingly, there has been disclosed improved support structure for a display pole which is readily attachable to a pre-existing shelving unit and is adaptable for different size shelves. The adaptability is in two respects. First, since the bracket mounts to the front of a shelf, it can be used with any depth shelf. Second, the adjustable coupler adapts to different size lips and to different spacing of the shelf apertures from the shelf front edge. While illustrative embodiments Of the inventive structure have been disclosed herein, it is understood that other embodiments and modifications may be apparent to those of ordinary skill in the art and it is intended that this invention be limited only by the scope of the appended claims.

What is claimed is:

1. A bracket for supporting a pole in a substantially vertical orientation from a substantially horizontal shelf, wherein the shelf has a planar top surface terminating in a front edge, a plurality of apertures through said top surface arranged at spaced locations along a line parallel to said front edge, and a lip which extends concavely downwardly and forwardly from said shelf front edge to terminate in a lip edge parallel to said shelf front edge, the bracket comprising:

a substantially planar plate member having at least one finger extending from an edge of said plate member, each of said at least one finger being sized to fit within a respective one of said apertures and being displaced out of the plane of said plate member so that said plate member can rest on said shelf planar top surface with said at least one finger extending through said respective aperture;

[a jacket] *an engagement* member adapted to [at least partially surround] *engage* said pole so as to substantially limit lateral movement of said pole with respect to said [jacket member] *bracket*;

coupling means for coupling said [jacket] *engagement* member to said plate member in such orientation that said pole is oriented substantially vertically when [held] *engaged* by said [jacket] *engagement* member when said plate member rests on said shelf planar top surface; and a stabilizer plate adapted to engage said lip edge when said plate member rests on said shelf planar top surface with said at least one finger extending through said respective aperture.

2. The bracket according to claim 1 wherein:

said at least one finger is configured to extend away from and back towards the plane of said plate member as said at least one finger is traversed from said plate member edge to the distal end of said at least one finger.

3. The bracket according to claim 2 wherein said shelf apertures are equally spaced apart and there are two parallel fingers spaced apart so as to each extend through a respective one of a pair of apertures.

4. The bracket according to claim 1 wherein said coupling means includes:

an elongated bar member secured at a first end to said [jacket] *engagement* member and at a second end to said stabilizer plate;

an elongated coupling member secured at a first end to said plate member opposite said at least one finger and extending away from said at least one finger, said coupling member adapted for longitudinal overlapping sliding engagement with said bar member; and adjustable securing means for securing said coupling member to said bar member with a desired overlap therebetween so that the position of said stabilizer plate relative to said plate member is such to insure that said stabilizer plate engages said lip edge when said plate member rests on said shelf planar top surface with said at least one finger extending through said respective aperture.

5. The bracket according to claim 4 wherein said adjustable securing means includes:

an elongated longitudinal slot in said coupling member and overlying said bar member; and clamping means extending through said slot for clamping said coupling member to said bar member.

6. The bracket according to claim 5 wherein said clamping means includes:

a threaded opening in said bar member in registration with said slot; and a threaded member extending through said slot and threadedly engaged in said threaded opening, said threaded member having an enlarged head which bears against said coupling member when said threaded member is threaded into said threaded opening.

7. The bracket according to claim 1 further including biasing means for resiliently biasing said stabilizer plate toward said plate member.

8. The bracket according to claim 7 wherein said coupling means includes a first elongated hollow bar member secured at a first end to said jacket member and at a second end to said plate member, with said [jacket] *engagement* member closing said first bar member first end and said first bar member second end being open, and said biasing means includes:

a second elongated hollow bar member open at a first end and secured at a second end to said stabilizer plate, with said stabilizer plate closing said second bar member second end, said second bar member being disposed at least partially within said first bar member for longitudinal movement therein; and a compression spring disposed within said first and second bar members, said spring bearing against said [jacket] *engagement* member at a first of its ends and against said stabilizer plate at a second of its ends.

9. The bracket according to claim 8 wherein said biasing means further includes means for limiting the movement of said second bar member relative to said first bar member, comprising:

an elongated longitudinal slot in said first bar member;

an opening in said second bar member in registration with said slot; and a pin member extending through said slot and into said opening.

10. The bracket according to claim 9 wherein said opening in said second bar member is internally threaded and said pin member comprises a threaded screw.

11. A bracket for supporting a pole in a substantially vertical orientation from a substantially horizontal shelf, wherein the shelf has a planar top surface terminating in a front edge, a plurality of apertures through said top surface arranged at spaced locations along a line parallel to said front edge, and a lip which extends concavely downwardly and forwardly from said shelf front edge to terminate in a lip edge parallel to said shelf front edge, the bracket comprising:

a substantially planar plate member having at least one finger extending from an edge of said plate member, each of said at least one finger being sized to fit within a respective one of said apertures and being displaced out of the plane of said plate member so that said plate member can rest on said shelf planar top surface with said at least one finger extending through said respective aperture;

[a jacket] *an engagement* member adapted to [at least partially surround] *engage* said pole so as to substantially limit lateral movement of said pole with respect to said [jacket member] *bracket*;

coupling means for coupling said [jacket] *engagement* member to said plate member in such orientation that said pole is oriented substantially vertically when [held] *engaged* by said [jacket] *engagement* member when said plate member rests on said shelf planar top surface; and securement means coupled to said [jacket] *engagement* member for engaging said pole to prevent longitudinal movement of said pole with respect to said [jacket member] *bracket*.

12. The bracket according to claim 11 for use with a pole formed with a plurality of longitudinally spaced apertures, wherein said [jacket] *engagement* member includes an aperture and said securement means includes a pin member insertable through said [jacket] *engagement* member aperture and a selected one of said pole apertures.

13. A pole support system for use with a pair of vertically spaced substantially horizontal shelves each having a planar top surface terminating in a front edge and with a plurality of apertures through said top surface arranged at spaced locations along a line parallel to said front edge, and including a pair of brackets each comprising:

a substantially planar plate member having at least one finger extending from an edge of said plate member, each of said at least one finger being sized to fit within a respective one of said apertures and being displaced out of the plane of said plate member so that said plate member can rest on said shelf planar top surface with said at least one finger extending through said respective aperture;

[a jacket] *an engagement* member adapted to [at least partially surround] *engage* said pole so as to substantially limit lateral movement of said pole with respect to said [jacket member] *each bracket*; and coupling means for coupling said [jacket] *engagement* member to said plate member in such orientation that said pole is oriented substantially vertically when [held] *engaged* by said [jacket] *engagement* member when said plate member rests on said shelf planar top surface;

wherein a first of said brackets is secured to a first of said shelves and the second of said brackets is secured to the second of said shelves in vertical alignment with the first bracket.

*14. The bracket according to claim 13 wherein said engagement member is adapted to at least partially surround said pole.*

*15. The bracket according to claim 1 wherein said engagement member is adapted to at least partially surround said pole.*

*16. The pole support system according to claim 11 wherein said engagement member is adapted to at least partially surround said pole.*

* * * * *